(12) United States Patent
Jiao et al.

(10) Patent No.: US 11,698,628 B2
(45) Date of Patent: Jul. 11, 2023

(54) SYSTEM, METHOD, AND COMPUTER PROGRAM PRODUCT FOR OPTIMIZING A MANUFACTURING PROCESS

(71) Applicant: Vitro Flat Glass LLC, Cheswick, PA (US)

(72) Inventors: Yu Jiao, Blawnox, PA (US); Humberto Figueroa, Nuevo León (MX); James J. Finley, Pittsburgh, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 192 days.

(21) Appl. No.: 17/175,785

(22) Filed: Feb. 15, 2021

(65) Prior Publication Data

US 2021/0286341 A1 Sep. 16, 2021

Related U.S. Application Data

(60) Provisional application No. 62/990,260, filed on Mar. 16, 2020.

(51) Int. Cl.
*G05B 19/418* (2006.01)

(52) U.S. Cl.
CPC .......... *G05B 19/4183* (2013.01); *G05B 2219/32291* (2013.01)

(58) Field of Classification Search
CPC .............. G05B 19/4183; G05B 2219/32291
(Continued)

(56) References Cited

U.S. PATENT DOCUMENTS 6,370,437 B1 * 4/2002 Carter ............... G05B 5/01
706/62
2018/0284749 A1 10/2018 Celia et al.
(Continued)

FOREIGN PATENT DOCUMENTS

CN 104732067 A * 6/2015
CN 109711714 A * 5/2019
(Continued)

OTHER PUBLICATIONS

Amrit et al., "Optimizing process economics online using model predictive control", Computers and Chemical Engineering, 2013, pp. 334-343, vol. 58.
(Continued)

*Primary Examiner* — Hien D Khuu
(74) *Attorney, Agent, or Firm* — The Webb Law Firm (57) ABSTRACT

Provided are a system, method, and computer program product for optimizing a manufacturing process. The method includes receiving manufacturing data associated with a manufacturing process for manufacturing a product. The manufacturing data may include data from a plurality of data sources associated with a plurality of stages of the manufacturing process, and the manufacturing data may include values for a plurality of parameters including at least one process parameter value and at least one quality parameter value. The method includes generating a time-sequenced data structure including the manufacturing data and transforming the time-sequenced data structure to a positionally-dimensioned data structure based on timing data associated with the plurality of stages. The method includes determining a new value for the at least one process parameter value based on the positionally-dimensioned data structure and at least one algorithm and optimizing the manufacturing process based on the new value.

17 Claims, 6 Drawing Sheets

(58) Field of Classification Search
USPC ........................................................ 700/105
See application file for complete search history.

(56) References Cited

U.S. PATENT DOCUMENTS

| | | | |
|---|---|---|---|
| 2019/0129410 A1 | 5/2019 | Celia et al. | |
| 2020/0074370 A1 | 3/2020 | Oliveira Almeida et al. | |

FOREIGN PATENT DOCUMENTS

| | | | | |
|---|---|---|---|---|
| CN | 110263972 A | * | 9/2019 | ........... G06N 3/0445 |
| JP | 2006173373 A | * | 6/2006 | |
| KR | 2015-0043478 A | * | 4/2015 | |

OTHER PUBLICATIONS

Arbab et al., "Glass in Architecture", International Journal of Applied Glass Science, 2010, pp. 118-129, vol. 1:1.

Baldea et al., "Integrated production scheduling and process control: A systematic review", Computers and Chemical Engineering, 2014, pp. 377-390, vol. 71.

Biondi et al., "Optimization of multipurpose process plant operations: a multi-time-scale maintenance and production scheduling approach", Computers and Chemical Engineering, 2017, 37 pages.

Bloch et al., "Analysis of service-oriented architecture approaches suitable for modular process automation", IEEE ETFA, Sep. 7-9, 2016, 8 pages, Berlin.

Chan et al., "Predictive control with adaptive model maintenance: Application to power plants", Computers and Chemical Engineering, 2014, 13 pages.

Chu et al., "Integrated planning and scheduling under production uncertainties: Bi-level model formulation and hybrid solution method", Computers and Chemical Engineering, 2014, 18 pages.

Clark, "The IoT of Automation—A Totally New Way to Look at Control and Automation in the Process Industries", In Proceedings LCCC Workshop on Process Control (Technical Reports; No. TFRT-7649), Department of Automatic Control, Lund, pp. 104-108, Lund Institute of Technology, Lund University.

Daoutidis et al., "Sustainability and process control: A survey and perspective", Journal of Process Control, 2016, pp. 184-206, vol. 44.

Davis et al., "Smart manufacturing, manufacturing intelligence and demand-dynamic performance", Computer and Chemical Engineering, 2012, pp. 145-156, vol. 47.

Dias et al., "From process control to supply chain management: An overview of integrated decision making strategies", Computers and Chemical Engineering, 2017, 10 pages.

Dias et al., "Integration of Scheduling and Control Under Uncertainties: Review and Challenges", Chemical Engineering Research and Design, 2016, 47 pages.

Engell, "Feedback control for optimal process operation", Journal of Process Control, 2007, pp. 203-219, vol. 17.

Engell et al., "Proposal of a European Research and Innovation Agenda on Cyber-physical Systems of Systems—2016-2025", 2016, 32 pages, www.cosos.eu/roadmap.

Evans et al., "Industrial Internet: Pushing the Boundaries of Minds and Machines", General Electric White Paper, Nov. 26, 2012, 38 pages.

Finley, "Development of a multilayer thinfilm solar control windshield", Journal of Vacuum Science & Technology, 1996, pp. 736-746, vol. 14.

Finley, "Heat treatment and bending of low-E glass", Thin Solid Films, 1999, pp. 264-273, vol. 351.

Forbes, "ExxonMobil's Quest for the Future of Process Automation", ARC Advisory Group, Apr. 26, 2016, 4 pages.

Ganz et al., "Information Exploitation—New Data Techniques to Improve Plant Service", ABB Review, 2015, 12 pages.

Grossmann, "Enterprise-wide Optimization: A New Frontier in Process Systems Engineering", American Institute of Chemical Engineers, 2005, pp. 1846-1857, vol. 51:7.

Isaksson et al., "The Impact of Digitalization on the Future of Control and Operations", Computers and Chemical Engineering, 2017, pp. 122-129, vol. 114.

Lenz et al., "DeepMPC: Learning Deep Latent Features for Model Predictive Control", Robotics: Science and Systems (RSS), 2015, 9 pages.

"Industry 4.0, Capturing value at scale in discrete manufacturing", McKinsey & Company Report, Jul. 2019, 53 pages.

Nie et al., "Discrete Time Formulation for the Integration of Scheduling and Dynamic Optimization", Ind. Eng. Chem. Res., 2014, 13 pages.

Perea-Lopez et al., "A model predictive control strategy for supply chain optimization", Computers and Chemical Engineering, 2003, pp. 1201-1218, vol. 27.

Pinho et al., "IT in lean-based manufacturing industries: systematic literature review and research issues", International Journal of Production Research, 2017, 18 pages.

Sand et al., "Closing the loops: An industrial perspective on the present and future impact of control", European Journal of Control, 2013, pp. 341-350, vol. 19.

Stevens et al., "Integrating the supply chain . . . 25 years on", Int. J. Phys. Distrib. Logist. Manage., 2016, 32 pages, vol. 46:1.

Toumi et al., "Optimization-based control of a reactive simulated moving bed process for glucose isomerization", Chemical Engineering Science, 2004, pp. 3777-3792, vol. 59.

Waits, "Planar magnetron sputtering", J. Vac. Sci. Technol. 1978, pp. 178-187, vol. 15:2.

Ydstie, "Distributed decision making in complex organizations: the adaptive enterprise", Computers and Chemical Engineering, 2004, pp. 11-27, vol. 29.

Ydstie, "New Vistas for Process Control: Integrating Physics and Communication Networks", AIChE Journal, 2002, pp. 422-426, vol. 48:3.

Ydstie et al., "Passivity-Based Control on the Float-Glass Process", IEEE Control Systems Magazine, 2006, pp. 64-72.

Ydstie et al., "The Distributed Enterprize Integrates Business, IT and Process Systems Engineering", Process Systems Engineering, 2003, pp. 12-27.

* cited by examiner

SYSTEM, METHOD, AND COMPUTER PROGRAM PRODUCT FOR OPTIMIZING A MANUFACTURING PROCESS

CROSS-REFERENCE TO RELATED APPLICATION

This application claims priority to U.S. Provisional Patent Application No. 62/990,260, filed Mar. 16, 2020, the disclosure of which is hereby incorporated by reference in its entirety.

BACKGROUND

This disclosure relates generally to manufacturing processes and, in non-limiting embodiments, to systems, methods, and computer program products for optimizing a manufacturing process, such as a glass manufacturing process, and data processing techniques related thereto.

SUMMARY

According to some non-limiting embodiments or aspects, provided is a computer-implemented method to optimize a manufacturing process. The method may include receiving, with at least one processor, manufacturing data associated with a manufacturing process for manufacturing a product. The manufacturing data may include data from a plurality of data sources associated with a plurality of stages of the manufacturing process. The manufacturing data may include values for a plurality of parameters including at least one process parameter value and at least one quality parameter value. The method may include generating, with at least one processor, a time-sequenced data structure including the manufacturing data. Each parameter of the plurality of parameters may be associated with a time in the time-sequenced data structure. The method may include transforming, with at least one processor, the time-sequenced data structure to a positionally-dimensioned data structure based on timing data associated with the plurality of stages. Each parameter of the plurality of parameters may be associated with at least one position. The method may include determining, with at least one processor, a new value for the at least one process parameter value based on the positionally-dimensioned data structure and at least one algorithm. The method may include optimizing the manufacturing process based on the new value.

In some non-limiting embodiments or aspects, transforming the time-sequenced data structure to the positionally-dimensioned data structure may include: identifying, with at least one processor, a zone for each parameter of the plurality of parameters; determining, with at least one processor, for each parameter, a time delay factor based on a length of the zone for the parameter and a line speed of the zone; and generating, with at least one processor, the positionally-dimensioned data structure using a data matrix transformation based on the time-sequenced data structure, the zone for each parameter, and the time delay factor for each parameter.

In some non-limiting embodiments or aspects, the manufacturing process may be a glass manufacturing process and the product may include a coated glass product. The plurality of parameters may include: temperature, event time, electrical arcing, gas flow, voltage, current, power, pressure, or any combination thereof.

In some non-limiting embodiments or aspects, the method may include detecting, with at least one processor, at least one outlier parameter value in the time-sequenced data structure or the positionally-dimensioned data structure. The method may include removing, with at least one processor, the at least one outlier parameter value. The at least one algorithm may include a machine-learning algorithm configured to output the new value based on a model and at least one user input value.

In some non-limiting embodiments or aspects, the method may include identifying, with at least one processor, a set of empty data entries in the time-sequenced data structure or the positionally-dimensioned data structure. The method may include determining, with at least one processor, a proportion of missing data by comparing a size of the set of empty data entries to the size of the time-sequenced data structure or the positionally-dimensioned data structure. The method may include comparing, with at least one processor, the proportion of missing data to a predetermined tolerance threshold. The method may include, in response to the proportion of missing data not satisfying the predetermined tolerance threshold, deleting the set of empty data entries from the time-sequenced data structure or the positionally-dimensioned data structure. The method may include, in response to the proportion of missing data satisfying the predetermined tolerance threshold, imputing data into the set of empty data entries.

According to some non-limiting embodiments or aspects, provided is a system for optimizing a manufacturing process. The system may include at least one processor programmed or configured to receive manufacturing data associated with a manufacturing process for manufacturing a product. The manufacturing data may include data from a plurality of data sources associated with a plurality of stages of the manufacturing process. The manufacturing data may include values for a plurality of parameters including at least one process parameter value and at least one quality parameter value. The at least one processor may be programmed or configured to generate a time-sequenced data structure including the manufacturing data. Each parameter of the plurality of parameters may be associated with a time in the time-sequenced data structure. The at least one processor may be programmed or configured to transform the time-sequenced data structure to a positionally-dimensioned data structure based on timing data associated with the plurality of stages. Each parameter of the plurality of parameters may be associated with at least one position. The at least one processor may be programmed or configured to determine a new value for the at least one process parameter value based on the positionally-dimensioned data structure and at least one algorithm. The at least one processor may be programmed or configured to optimize the manufacturing process based on the new value.

In some non-limiting embodiments or aspects, transforming the time-sequenced data structure to the positionally-dimensioned data structure may include: identifying a zone for each parameter of the plurality of parameters; determining, for each parameter, a time delay factor based on a length of the zone for the parameter and a line speed of the zone; and generating the positionally-dimensioned data structure using a data matrix transformation based on the time-sequenced data structure, the zone for each parameter, and the time delay factor for each parameter.

In some non-limiting embodiments or aspects, the manufacturing process may include a glass manufacturing process and the product may include a coated glass product. The plurality of parameters may include: temperature, event time, electrical arcing, gas flow, voltage, current, power, pressure, or any combination thereof.

In some non-limiting embodiments or aspects, the at least one processor may be further programmed or configured to detect at least one outlier parameter value in the time-sequenced data structure or the positionally-dimensioned data structure. The at least one processor may be further programmed or configured to remove the at least one outlier parameter value. In some non-limiting embodiments or aspects, the at least one algorithm may include a machine-learning algorithm configured to output the new value based on a model and at least one user input value.

According to non-limiting embodiments or aspects, provided is a computer program product for optimizing a manufacturing process. The computer program product may include at least one non-transitory computer-readable medium including program instructions. The program instructions may, when executed by at least one processor, cause the at least one processor to receive manufacturing data associated with a manufacturing process for manufacturing a product. The manufacturing data may include data from a plurality of data sources associated with a plurality of stages of the manufacturing process. The manufacturing data may include values for a plurality of parameters including at least one process parameter value and at least one quality parameter value. The program instructions may cause the at least one processor to generate a time-sequenced data structure including the manufacturing data. Each parameter of the plurality of parameters may be associated with a time in the time-sequenced data structure. The program instructions may cause the at least one processor to transform the time-sequenced data structure to a positionally-dimensioned data structure based on timing data associated with the plurality of stages. Each parameter of the plurality of parameters may be associated with at least one position. The program instructions may cause the at least one processor to determine a new value for the at least one process parameter value based on the positionally-dimensioned data structure and at least one algorithm. The program instructions may cause the at least one processor to optimize the manufacturing process based on the new value.

In some non-limiting embodiments or aspects, transforming the time-sequenced data structure to the positionally-dimensioned data structure may include: identifying a zone for each parameter of the plurality of parameters; determining, for each parameter, a time delay factor based on a length of the zone for the parameter and a line speed of the zone; and generating the positionally-dimensioned data structure using a data matrix transformation based on the time-sequenced data structure, the zone for each parameter, and the time delay factor for each parameter.

In some non-limiting embodiments or aspects, the manufacturing process may include a glass manufacturing process, the product may include a coated glass product, and the plurality of parameters may include: temperature, event time, electrical arcing, gas flow, voltage, current, power, pressure, or any combination thereof.

In some non-limiting embodiments or aspects, the program instructions may further cause the at least one processor to detect at least one outlier parameter value in the time-sequenced data structure or the positionally-dimensioned data structure. The program instructions may cause the at least one processor to remove the at least one outlier parameter value. In some non-limiting embodiments or aspects, the at least one algorithm may include a machine-learning algorithm configured to output the new value based on a model and at least one user input value.

In some non-limiting embodiments or aspects, the manufacturing process may be a manufacturing process for a glass product. In some non-limiting embodiments or aspects, the manufacturing process may be a manufacturing process for a coated glass product. In some non-limiting embodiments or aspects, the manufacturing process may be for coating a glass product.

Further embodiments or aspects are set forth in the following numbered clauses:

Clause 1: A computer-implemented method to optimize a manufacturing process, comprising: receiving, with at least one processor, manufacturing data associated with a manufacturing process for manufacturing a product, the manufacturing data comprising data from a plurality of data sources associated with a plurality of stages of the manufacturing process, the manufacturing data comprising values for a plurality of parameters including at least one process parameter value and at least one quality parameter value; generating, with at least one processor, a time-sequenced data structure comprising the manufacturing data, wherein each parameter of the plurality of parameters is associated with a time in the time-sequenced data structure; transforming, with at least one processor, the time-sequenced data structure to a positionally-dimensioned data structure based on timing data associated with the plurality of stages, wherein each parameter of the plurality of parameters is associated with at least one position; determining, with at least one processor, a new value for the at least one process parameter value based on the positionally-dimensioned data structure and at least one algorithm; and optimizing the manufacturing process based on the new value.

Clause 2: The computer-implemented method of clause 1, wherein transforming the time-sequenced data structure to the positionally-dimensioned data structure comprises: identifying, with at least one processor, a zone for each parameter of the plurality of parameters; determining, with at least one processor, for each parameter, a time delay factor based on a length of the zone for the parameter and a line speed of the zone; and generating, with at least one processor, the positionally-dimensioned data structure using a data matrix transformation based on the time-sequenced data structure, the zone for each parameter, and the time delay factor for each parameter.

Clause 3: The computer-implemented method of clause 1 or 2, wherein the manufacturing process comprises a glass manufacturing process and the product comprises a coated glass product.

Clause 4: The computer-implemented method of any of clauses 1-3, wherein the plurality of parameters comprises: temperature, event time, electrical arcing, gas flow, voltage, current, power, pressure, or any combination thereof.

Clause 5: The computer-implemented method of any of clauses 1-4, further comprising: detecting, with at least one processor, at least one outlier parameter value in the time-sequenced data structure or the positionally-dimensioned data structure; and removing, with at least one processor, the at least one outlier parameter value.

Clause 6: The computer-implemented method of any of clauses 1-5, wherein the at least one algorithm comprises a machine-learning algorithm configured to output the new value based on a model and at least one user input value.

Clause 7: The computer-implemented method of any of clauses 1-6, further comprising: identifying, with at least one processor, a set of empty data entries in the time-sequenced data structure or the positionally-dimensioned data structure; determining, with at least one processor, a proportion of missing data by comparing a size of the set of empty data entries to the size of the time-sequenced data structure or the positionally-dimensioned data structure; and comparing, with at least one processor, the proportion of missing data to a predetermined tolerance threshold.

Clause 8: The computer-implemented method of any of clauses 1-7, further comprising, in response to the proportion of missing data not satisfying the predetermined tolerance threshold, deleting the set of empty data entries from the time-sequenced data structure or the positionally-dimensioned data structure.

Clause 9: The computer-implemented method of any of clauses 1-8, further comprising, in response to the proportion of missing data satisfying the predetermined tolerance threshold, imputing data into the set of empty data entries.

Clause 10: A system for optimizing a manufacturing process, comprising: at least one processor programmed or configured to: receive manufacturing data associated with a manufacturing process for manufacturing a product, the manufacturing data comprising data from a plurality of data sources associated with a plurality of stages of the manufacturing process, the manufacturing data comprising values for a plurality of parameters including at least one process parameter value and at least one quality parameter value; generate a time-sequenced data structure comprising the manufacturing data, wherein each parameter of the plurality of parameters is associated with a time in the time-sequenced data structure; transform the time-sequenced data structure to a positionally-dimensioned data structure based on timing data associated with the plurality of stages, wherein each parameter of the plurality of parameters is associated with at least one position; determine a new value for the at least one process parameter value based on the positionally-dimensioned data structure and at least one algorithm; and optimize the manufacturing process based on the new value.

Clause 11: The system of clause 10, wherein transforming the time-sequenced data structure to the positionally-dimensioned data structure comprises: identifying a zone for each parameter of the plurality of parameters; determining, for each parameter, a time delay factor based on a length of the zone for the parameter and a line speed of the zone; and generating the positionally-dimensioned data structure using a data matrix transformation based on the time-sequenced data structure, the zone for each parameter, and the time delay factor for each parameter.

Clause 12: The system of clause 10 or 11, wherein the manufacturing process comprises a glass manufacturing process and the product comprises a coated glass product.

Clause 13: The system of any of clauses 10-12, wherein the plurality of parameters comprises: temperature, event time, electrical arcing, gas flow, voltage, current, power, pressure, or any combination thereof.

Clause 14: The system of any of clauses 10-13, wherein the at least one processor is further programmed or configured to: detect at least one outlier parameter value in the time-sequenced data structure or the positionally-dimensioned data structure; and remove the at least one outlier parameter value.

Clause 15: The system of any of clauses 10-14, wherein the at least one algorithm comprises a machine-learning algorithm configured to output the new value based on a model and at least one user input value.

Clause 16: A computer program product for optimizing a manufacturing process, comprising at least one non-transitory computer-readable medium including program instructions that, when executed by at least one processor, cause the at least one processor to: receive manufacturing data associated with a manufacturing process for manufacturing a product, the manufacturing data comprising data from a plurality of data sources associated with a plurality of stages of the manufacturing process, the manufacturing data comprising values for a plurality of parameters including at least one process parameter value and at least one quality parameter value; generate a time-sequenced data structure comprising the manufacturing data, wherein each parameter of the plurality of parameters is associated with a time in the time-sequenced data structure; transform the time-sequenced data structure to a positionally-dimensioned data structure based on timing data associated with the plurality of stages, wherein each parameter of the plurality of parameters is associated with at least one position; determine a new value for the at least one process parameter value based on the positionally-dimensioned data structure and at least one algorithm; and optimize the manufacturing process based on the new value.

Clause 17: The computer program product of clause 16, wherein transforming the time-sequenced data structure to the positionally-dimensioned data structure comprises: identifying a zone for each parameter of the plurality of parameters; determining, for each parameter, a time delay factor based on a length of the zone for the parameter and a line speed of the zone; and generating the positionally-dimensioned data structure using a data matrix transformation based on the time-sequenced data structure, the zone for each parameter, and the time delay factor for each parameter.

Clause 18: The computer program product of clause 16 or 17, wherein the manufacturing process comprises a glass manufacturing process, the product comprises a coated glass product, and the plurality of parameters comprises: temperature, event time, electrical arcing, gas flow, voltage, current, power, pressure, or any combination thereof.

Clause 19: The computer program product of any of clauses 16-18, wherein the program instructions further cause the at least one processor to: detect at least one outlier parameter value in the time-sequenced data structure or the positionally-dimensioned data structure; and remove the at least one outlier parameter value.

Clause 20: The computer program product of any of clauses 16-19, wherein the at least one algorithm comprises a machine-learning algorithm configured to output the new value based on a model and at least one user input value.

Clause 21: A computer-implemented method to optimize a glass manufacturing process, comprising: receiving, with at least one processor, manufacturing data associated with a glass manufacturing process for manufacturing a coated glass product, the manufacturing data comprising data from a plurality of data sources associated with a plurality of stages of the glass manufacturing process, the manufacturing data comprising values for a plurality of parameters including at least one process parameter value and at least one quality parameter value; generating, with at least one processor, a time-sequenced data structure comprising the manufacturing data, wherein each parameter of the plurality of parameters is associated with a time in the time-sequenced data structure; transforming, with at least one processor, the time-sequenced data structure to a positionally-dimensioned data structure based on timing data associated with the plurality of stages, wherein each parameter of the plurality of parameters is associated with at least one position; determining, with at least one processor, a new value for the at least one process parameter value based on the positionally-dimensioned data structure and at least one algorithm; and optimizing the glass manufacturing process based on the new value.

Clause 22: A system for optimizing a glass manufacturing process, comprising: at least one processor programmed or configured to: receive manufacturing data associated with a glass manufacturing process for manufacturing a coated glass product, the manufacturing data comprising data from a plurality of data sources associated with a plurality of stages of the glass manufacturing process, the manufacturing data comprising values for a plurality of parameters including at least one process parameter value and at least one quality parameter value; generate a time-sequenced data structure comprising the manufacturing data, wherein each parameter of the plurality of parameters is associated with a time in the time-sequenced data structure; transform the time-sequenced data structure to a positionally-dimensioned data structure based on timing data associated with the plurality of stages, wherein each parameter of the plurality of parameters is associated with at least one position; determine a new value for the at least one process parameter value based on the positionally-dimensioned data structure and at least one algorithm; and optimize the glass manufacturing process based on the new value.

Clause 23: A computer program product for optimizing a glass manufacturing process, comprising at least one non-transitory computer-readable medium including program instructions that, when executed by at least one processor, cause the at least one processor to: receive manufacturing data associated with a glass manufacturing process for manufacturing a coated glass product, the manufacturing data comprising data from a plurality of data sources associated with a plurality of stages of the glass manufacturing process, the manufacturing data comprising values for a plurality of parameters including at least one process parameter value and at least one quality parameter value; generate a time-sequenced data structure comprising the manufacturing data, wherein each parameter of the plurality of parameters is associated with a time in the time-sequenced data structure; transform the time-sequenced data structure to a positionally-dimensioned data structure based on timing data associated with the plurality of stages, wherein each parameter of the plurality of parameters is associated with at least one position; determine a new value for the at least one process parameter value based on the positionally-dimensioned data structure and at least one algorithm; and optimize the glass manufacturing process based on the new value.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE APPENDIX

Additional advantages and details are explained in greater detail below with reference to the non-limiting, exemplary embodiments that are illustrated in the accompanying figures, in which.

DETAILED DESCRIPTION

It is to be understood that the embodiments may assume various alternative variations and step sequences, except where expressly specified to the contrary. It is also to be understood that the specific devices and processes illustrated in the attached appendix, and described in the following specification, are simply exemplary embodiments or aspects of the disclosure. Hence, specific dimensions and other physical characteristics related to the embodiments or aspects disclosed herein are not to be considered as limiting. No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, touchscreen, etc.). Further, multiple computers, e.g., servers, or other computerized devices directly or indirectly communicating in the network environment may constitute a "system" or a "computing system."

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

Non-limiting embodiments are directed to systems, methods, and computer program products for optimizing a manufacturing process, such as a glass manufacturing process. Such manufacturing processes produce large amounts of data in a real-time manner and collected by a variety of different devices and components, which presents challenges to effectively and efficiently storing, structuring, managing, and accessing such data. Non-limiting embodiments described herein provide for improved efficiencies throughout the manufacturing process, including continual and/or periodic optimization of process parameters (e.g., to create a better product, to use less materials, to create fewer scrap materials, to accelerate the manufacturing process, and/or the like). Moreover, the raw data collected from devices and components of a manufacturing process may present data processing inefficiencies and errors when trying to analyze such data to generate optimized process parameters. Accordingly, non-limiting embodiments described herein provide for unique techniques for restructuring manufacturing data for use in analytical algorithms, including, but not limited to, machine-learning algorithms.

Manufacturing Process Data

The foregoing systems, methods, and computer program products may be employed for optimizing a glass manufacturing process. While description herein may refer to technical implementation in a glass manufacturing context, it will be appreciated that many of the technical features and advantages are applicable to any type of manufacturing process involving the collection and analysis of manufacturing data.

Described systems and methods may provide manufacturing efficiencies through process optimization. For example, in flat glass manufacturing, manufacturing efficiencies may include: (i) reducing the number of defects in the product including partially melted sand particles and small glass bubbles; (ii) reducing energy usage to melt and produce flat and coated glass products; (iii) reducing manufacturing waste such as the rejected glass, cutting and edging trim losses; (iv) optimizing glass thickness distribution; (v) reducing material loss during product change over; (vi) optimizing raw material usage; and (vii) manage inventory and the supply chain.

By way of another example, in the glass coating process, manufacturing efficiencies may include (i) minimize the number of defects, e.g., pinholes resulting from process debris and electrical arcing in the plasma process; (ii) optimize the product color uniformity; (iii) minimize production downtime, e.g., resulting from frequent cathode cleaning and/or replenishing; (iv) minimize the new product development and commercialization cycle; and (vi) improve equipment reliability and robustness by incorporating predictive maintenance.

Described systems and methods may use data from various sources across a manufacturing process to be optimized. In some non-limiting embodiments or aspects, Table 1 provides various data sources for a glass manufacturing process, including sample rates from the various data sources and exemplary data storage locations.

TABLE 1

| Process | Data Sample Rate | Data uploaded to Cloud |
|---|---|---|
| Sensor and Machine control | 1 sec-10 sec | On Premise |
| Key process parameter control loops | 10 sec-to 5 min | On Premise |
| Process supervisory control and management | 30 min-1 hr | In Cloud and/or On Premise |
| Process optimization models | 1-4 hr | In Cloud |
| Supply chain and process wide control | 8-24 hr | In Cloud |
| Enterprise wide optimization | >24 hr | In Cloud |

In some non-limiting embodiments or aspects, a data flow of described systems and methods may begin with extracting manufacturing data from various data sources and uploading the data to a cloud-based data platform. The data may be processed, e.g., validated, cleaned, and organized, into a process-wide dataset for analysis. The data may be stored in a validated dataset in the cloud-based data platform. The data may be analyzed based on different manufacturing and business needs.

In some non-limiting embodiments or aspects, data validation and feature engineering may be categorized into the following exemplary categories: (i) general data errors; (ii) process-specific and case-specific data treatment; and (iii) process feature engineering to create new process variables. In the first category, general data errors may be identified. General data errors may originate from instruments and computer systems, including, but not limited to, machine-related data errors in the process database, server-generated instrument errors resulting from non-connection, shutdown, or SQL server processes, and/or flat file data server generated errors. Such data errors may be associated with a specific data source. Data errors such as missing data and outliers may be rectified automatically. In the second category, data treatment and engineering may be applied as specific to a process, including, but not limited to, product segmentation, process time delay, process data components organization, and process dynamic extraction. In the third category, new process variables may be generated using process feature engineering. The new variables may represent the process insight and hidden dynamics that may effectively reveal the process features needed for AI modeling and intelligent action generation.

In some non-limiting embodiments or aspects, a manufacturing process may be optimized according to the following stages: (i) data dimension transformation; (ii) outlier data elimination; (iii) data imputation; and (iv) process data feature engineering, including cleaning cycle process identification and product layer attributes.

Data Dimension Transformation

In a manufacturing process, a product may be transported through various zones where the product may be modified, treated, assembled, and/or the like. It may be advantageous to determine a cause and effect relationship among quality variables and process variables in a manufacturing process, and the speeds and/or transportation time delays in and/or between zones may affect the accurate determination of the relationship between quality variables and process variables. For example, in a glass manufacturing process, the determination of cause and effect among quality and process variables may be complicated by the nature of the glass coating manufacturing process. Due to the glass sheet being transported from the load-end through various coating process segments (e.g., washer zone, coating zone, etc.) with respective line speeds, transportation time delays among glass product quality variables and process variables will be generated which may affect the correct interpretation of cause and effect along the coater locations or zones. Described systems and methods provide for the accurate identification of cause and effect relationships, including a method of transforming a data matrix from a time-sequenced data structure to a positionally-dimensioned data structure.

There may exist a time lag between product quality variables measured at the end of the manufacturing process and process variables measured along a manufacturing process (e.g., several minutes). Zone locations may be denoted to identify the relationship between individual zone parameters and their effect on, e.g., defects. Zone locations may be denoted by applying a data matrix dimension transformation from a time-sequenced data structure to a positionally-dimensioned data structure. A reference point may be selected at a position in the manufacturing process, and a time delay may be calculated at positions along the direction of process flow. The location of each individual zone may be used to mark the position to transform time-sequenced data into positionally-dimensioned data. After the transformation is implemented, the data used for modeling may be time independent, so that the correlation between process and quality variables becomes positionally dependent. The generalized equation for time lag calculation for each zone may be:

$$\Delta t = \left(\frac{L}{v}\right) \qquad \text{Formula 1}$$

where $\Delta t$ denotes the time lag for the zone, L denotes the length of the zone in the product travel direction, and v denotes the line speed. The data matrix dimensional transformation may be considered to be a function of the line speed.

To implement the time lag compensation across all zones of a manufacturing process, time delay may be calculated in two categories: (1) individual zone delay; and (2) time delay between a quality (e.g., defect) inspection scan to the zone delay reference point. The zone delay reference point (e.g., reference time stamp) may be defined at an individual zone. The equation used for individual zone time lag may be as follows:

$$\Delta Kn = Tr + n \times \Delta t \qquad \text{Formula 2}$$

where $\Delta Kn$ denotes a total time lag for a zone number n, where, e.g., n=1 to 10. Tr denotes the reference time stamp at the individual zone. The time lag between the quality (e.g., defect) inspection scan location and the zone delay reference point may be calculated by using the cross-correlation function.

Outlier Detection and Elimination

Outliers may include extreme values that deviate from the majority of observations of a data set. Outliers in a data set risk polluting the data with biased and/or misleading information. Outliers may indicate significant data variations produced by instrument errors, experimental procedure errors, and/or other human/equipment errors. Outlier detection may be categorized according to measured parameters of product in the manufacturing process. In the example of glass coating, outlier detection may be categorized according to, but is not limited to, the following categories of variables: (i) temperature; (ii) production line speed (which may vary with product); (iii) process event time; (iv) electrical arcing; (v) process gas flow; (vi) electrical voltage; (vii) electrical current; (viii) electrical power; (ix) process pressure; and/or the like.

The first step of outlier identification and detection may include determining outliers that may be introduced into a manufacturing process by events such as product changes and process cleaning. The second step of outlier identification and detection may include labeling outliers using a robust statistical method. In the first step, the system may identify powered-off zones and powered-on zones. During produce changes, different manufacturing zones may be either powered-off or powered-on, where powered-off zones produce product variable values predominantly equal to zero. Without first filtering out powered-off zones, a surplus of zero-valued parameters may dilute and skew measured statistical distributions. Digital flags may be introduced to identify events such as product and process cleaning. In the second step, outliers may be labeled, such as by using the interquartile range (IQR) method. The IQR may also be called the midspread and may be a measure of statistical dispersion being equal to the difference between the $75^{th}$ and $25^{th}$ percentiles, or between upper and lower quartiles, e.g., $IQR=Q_3-Q_1$. Without first adjusting for powered-off zones, the IQR may identify normal production data values as outliers, given a surplus of zero-valued parameters from powered-off zones. After accounting for powered-off zones, the IQR may properly identify outlier values outside of a usual, statistical distribution of values.

Missing Data Imputation

Missing data may occur when manufacturing process data sets are void, e.g., due to process events such as equipment failure. Missing data may be eliminated (e.g., empty columns deleted) if a missing data segment is sufficiently large (e.g., above a tolerance threshold). Missing data may be imputed if a missing data segment is sufficiently small (e.g., within a tolerance threshold). In some-non-limiting embodiments or aspects, the tolerance threshold of a missing data segment may be set to 5% of the total dataset.

Missing value imputation may be executed according to one or more variable categories, which may include, but is not limited to: (i) constant-value variables; (ii) probabilistic variables; (iii) conditional variables; and/or the like. In a first category, constant-value variables (e.g., process set point variables) may be imputed by replacing missing values with statistical average data (e.g., variable column mean) and/or adjacent values (e.g., a constant value from an adjacent record). In a second category, probabilistic variables may be imputed by analyzing correlations between data columns and generating estimates using linear models, e.g., using a low-dimensional approximation of the data. In a third category, conditional variables may be imputed using multivariate imputation by chained equations (MICE), in which each variable with missing data is modeled conditionally using other variables in the data before filling in the missing values. MICE may include making multiple passes over the dataset to determine a fill-in value.

In some non-limiting embodiments or aspects, a constant value from a previous data record may be imputed into a data record having missing data values. Resolving missing data allows machine learning models to operate when such models require continuous datasets (e.g., without disconnected data segments).

FIGURES

Figure 1:
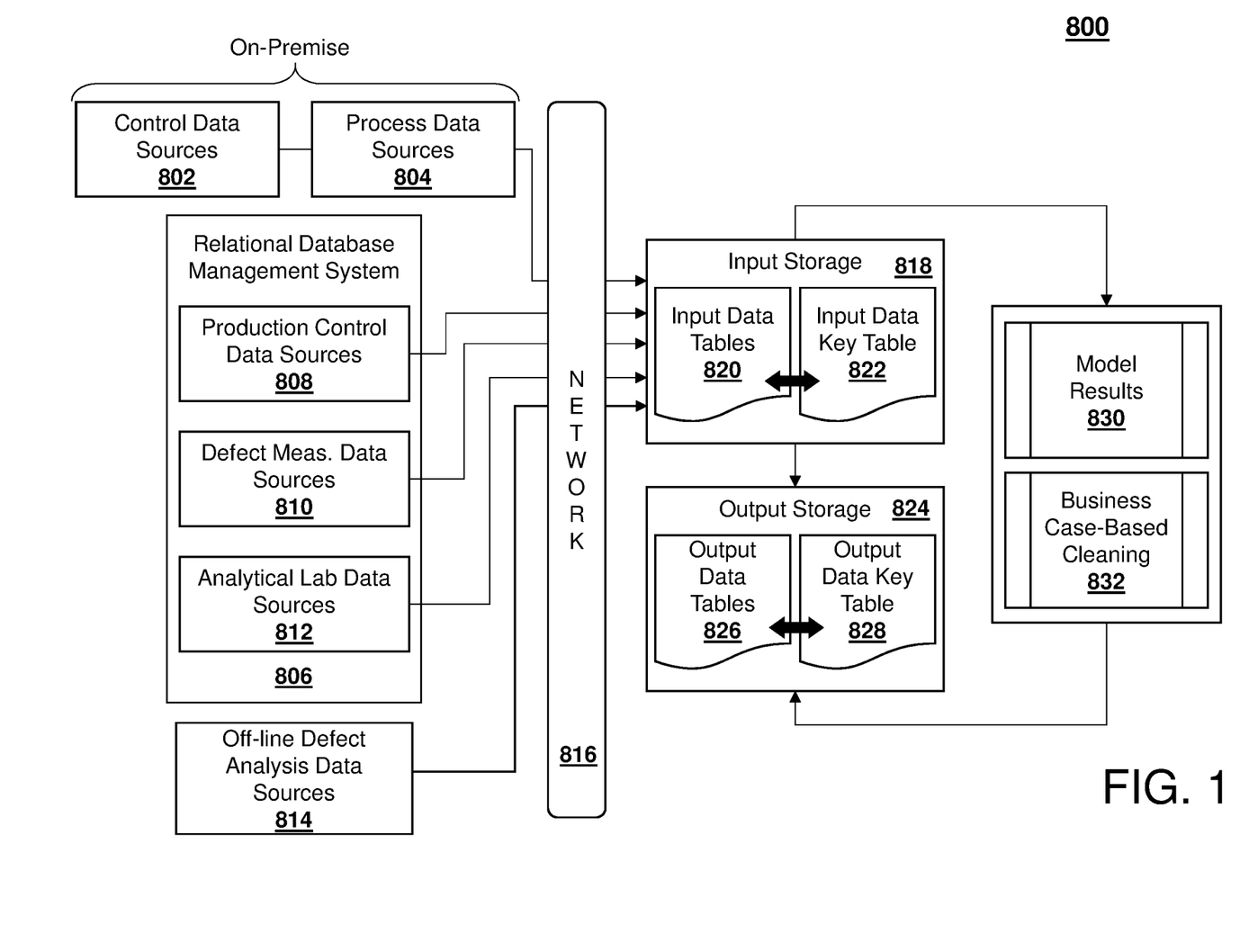
FIG. 1 illustrates a schematic diagram of non-limiting embodiments or aspects of a system and method for optimizing a manufacturing process.

Referring now to FIG. 1, shown is a system 800 for optimizing a manufacturing process according to non-limiting embodiments or aspects. System 800 includes a process flow for an in-cloud data architecture. The system 800 may include a plurality of data sources, which may include one or more computing devices that may generate and/or store data. The system 800 may include a plurality of on-premise data sources 802, 804, including control data sources 802 (e.g., providing data of sensor and machine control) and process data sources 804 (e.g., providing data of key process parameter control loops). The on-premise data sources 802, 804 may be in communication with a cloud computing system (e.g., Microsoft Azure), which may include an input storage system 818. The on-premise data sources 802, 804 may communicate with the cloud computing system using a communication network 816 (e.g., utilizing a self-hosted integration runtime service). The system 800 may further include a relational database management system 806 (e.g., SQL Server). The relational database management system 806 may include production control data sources 808, defect measurement data sources 810, and analytical lab data sources 812. The data sources 808, 810, 812 of the relational database management system 806 may be in communication with the input storage system 818 via the communication network 816. System 800 may also include off-line defect analysis data sources 814, which may be in communication with the input storage system 818 via the communication network 816.

The system 800 may include the input storage system 818, where one, more, or all raw data storage and data validation processes may be conducted. The input storage system 818 may be operated by a system host (e.g., Data Lake). Input storage system 818 may include a plurality of input data tables 820 and an input data key table 822. The system 800 may include an output storage system 824, where one, more, or all processed data sets and the results of intelligent analysis are stored for historic data retrieval. The input storage system 818 may be associated with one or more machine-learning services, which may be used for data analysis. Machine-learning model results 830 and data sets after business case-based cleaning processes 832 may be communicated from the input storage system 818 to the output storage system 824.

Figure 2:
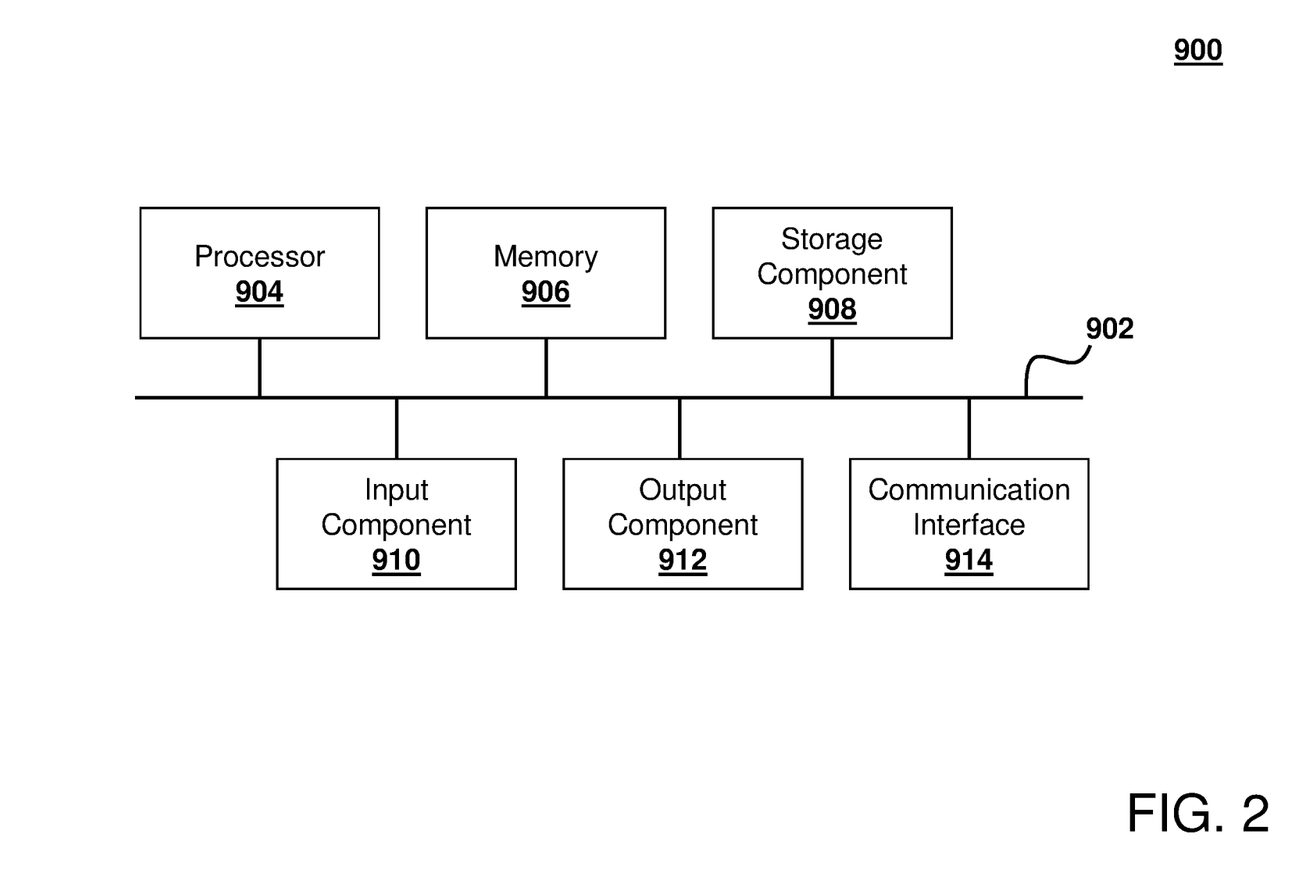
FIG. 2 illustrates example components of a computing device used in connection with non-limiting embodiments of a system, method, and computer program product for optimizing a manufacturing process.

Referring now to FIG. 2, shown is a diagram of example components of a computing device 900 for implementing and performing the systems and methods described herein according to non-limiting embodiments. Computing device 900 may corresponding to one or more computing devices of the system 800 of FIG. 1, including, but not limited to, one or more computing devices of: control data sources 802, process data sources 804, relational database management system 806, production control data sources 808, defect measurement data sources 810, analytical lab data sources 812, off-line defect analysis data sources 814, communication network 816, input storage system 818, output storage system 824, and/or one or more systems for controlling the aforesaid devices. In some non-limiting embodiments, device 900 may include additional components, fewer components, different components, or differently arranged components than those shown in FIG. 2. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed or configured to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 2, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 3:
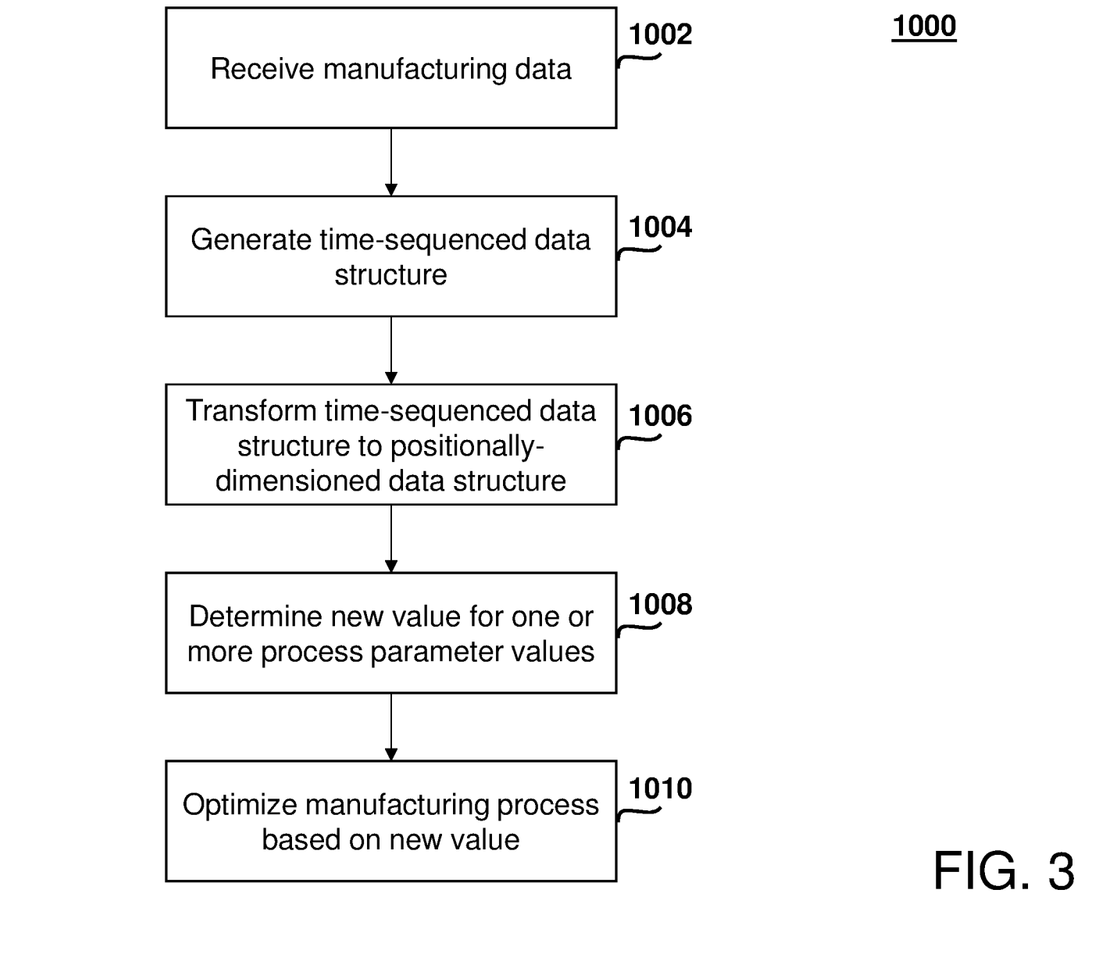
FIG. 3 illustrates a process diagram of non-limiting embodiments or aspects of a method for optimizing a manufacturing process.

Referring now to FIG. 3, depicted is a process 1000 for optimizing a manufacturing process according to non-limiting embodiments or aspects. One or more steps of process 1000 may be executed by one or more same computing devices of one or more other steps of the process 1000. One or more steps of the process 1000 may be executed by one or more computing devices of a communication network 816, input storage system 818, output storage system 824, and/or other systems for controlling devices of the system 800 of FIG. 1.

In step 1002, manufacturing data may be received. For example, the input storage system 818 may receive manufacturing data associated with a manufacturing process for manufacturing a product. The manufacturing data may include data from one or more data sources associated with one or more stages (e.g., production stages, assembly stages, treatment stages, etc.) of the manufacturing process. The manufacturing data may include values for a plurality of parameters, including one or more process parameter values and one or more quality parameter values. A process parameter may include one or more measurable (e.g., having a value) features and/or aspects of a stage of a manufacturing process (e.g., processing speed, processing temperature, processing pressure, etc.). A quality parameter may include one or more measurable (e.g., having a value) features and/or aspects of the product being manufactured. In some non-limiting embodiments or aspects, the manufacturing process may include a glass manufacturing process and the product may include a coated glass product. In some non-limiting embodiments or aspects, the plurality of parameters of the manufacturing data may include, but are not limited to: temperature, event time, electrical arcing, gas flow, voltage, current, power, pressure, or any combination thereof.

In step 1004, a time-sequenced data structure may be generated. For example, the input storage system 818 may generate a time-sequenced data structure that includes the manufacturing data, where each parameter of the plurality of parameters is associated with a time (e.g., of a measurement of a parameter of a manufacturing process and/or product) in the time-sequenced data structure. In some non-limiting embodiments or aspects, the time-sequenced data structure may be a data table where each parameter is dependent on, and sequenced according to, a time column.

In step 1006, the time-sequenced data structure may be transformed. For example, the input storage system 818 may transform the time-sequenced data structure to a positionally-dimensioned data structure. The transformation may be based on timing data associated with the plurality of stages. Each parameter of the plurality of parameters may be associated with at least one position in the positionally-dimensioned data structure. In some non-limiting embodiments or aspects, the positionally-dimensioned data structure may be a data table where each parameter is dependent on, and arranged according to, a position in the manufacturing process.

In step 1008, a new value for one or more process parameter values may be determined. For example, the input storage system 818 may determine a new value for the one or more process parameter values based on the positionally-dimensioned data structure and at least one algorithm. The at least one algorithm may include a machine-learning algorithm configured to output the new value based on a model (e.g., random forest model, neural network, etc.) and at least one user input value.

In step 1010, the manufacturing process may be optimized. For example, the input storage system 818 may optimize the manufacturing process based on the generated new value of step 1008. Optimization of a manufacturing process may include an improvement to a manufactured product (e.g., quality thereof) or volume of manufactured products (e.g., economies of manufacture, reduction in raw input consumption, reduction of redundant repeated steps, etc.). In some non-limiting embodiments or aspects, the input storage system 818 may execute one or more machine-learning models to generate recommendations for changes to one or more process parameters (e.g., optimizing process parameters), such as by making changes to one or more process control systems. In some non-limiting embodiments or aspects, optimization of a glass manufacturing process may include reduction of a number of defects in the glass product (e.g., partially melted sand particles, small glass bubbles, etc.), reduction in energy usage to melt and produce flat and coated glass products, reduction of manufacturing waste (e.g., rejected glass, cutting and edging trim losses, etc.), optimization of glass thickness distribution, reduction of material loss during product change over, inventory and supply change management, and/or the like.

Figure 4:
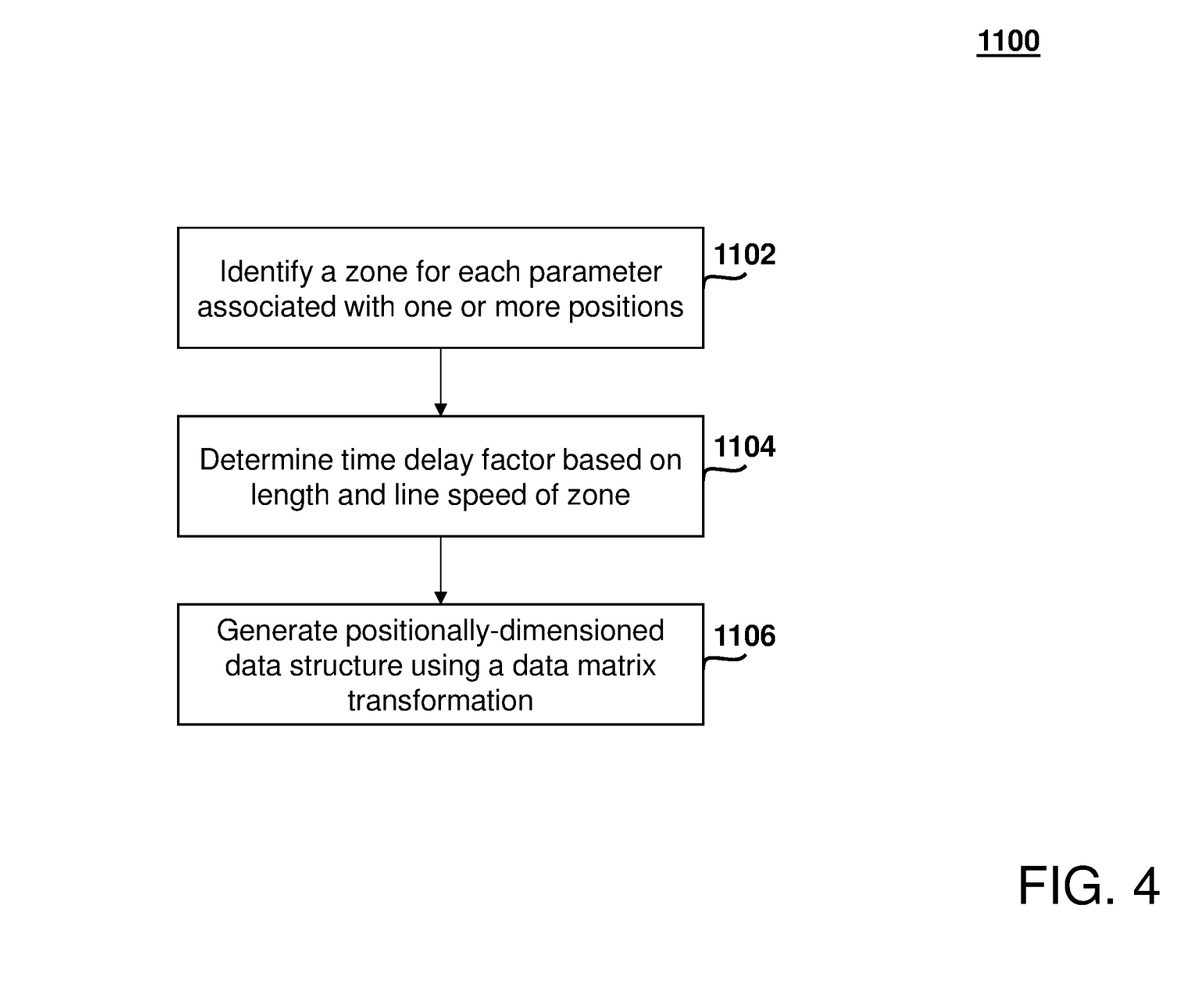
FIG. 4 illustrates a process diagram of non-limiting embodiments or aspects of a method for optimizing a manufacturing process.

Referring now to FIG. 4, depicted is a process 1100 for optimizing a manufacturing process according to non-limiting embodiments or aspects. One or more steps of process 1100 may be executed by one or more same computing devices of one or more other steps of the process 1100. One or more steps of the process 1100 may be executed by one or more computing devices of a communication network 816, input storage system 818, output storage system 824, and/or other systems for controlling devices of the system 800 of FIG. 1. The depicted process 1100 may be representative of a method of transforming a time-sequenced data structure to a positionally-dimensioned data structure.

In step 1102, a zone for each parameter of the plurality of parameters may be identified. For example, the input storage system 818 may identify a zone (e.g., a manufacturing zone) for each parameter of the plurality of parameters. In step 1104, a time delay factor may be determined. For example, the input storage system 818 may determine, for each parameter, a time delay factor based on a length (e.g., a number of meters) of the zone for the parameter and a line speed (e.g., a value of meters per second) of the zone. In step 1106, the positionally-dimensioned data structure may be generated. For example, the input storage system 818 may generate the positionally-dimensioned data structure using a data matrix transformation based on the time-sequenced data structure, the zone for each parameter, and the time delay factor for each parameter. The below tables demonstrate a non-limiting embodiment or aspect of a result of data matrix transformation, in which time alignment (e.g., before alignment in Table 2, after alignment in Table 3) is implemented in a manufacturing process for glass coating. The columns represent coating zone process conditions and the rows represent time stamps of a real-time series.

TABLE 2

| | Zone 0 | Zone 1 | Zone 2 | Zone 3 | Zone 4 | Zone 5 |
|---|---|---|---|---|---|---|
| Sep. 10, 2017 21:10:00 | Cleaning | Coating | Coating | Coating | Coating | Coating |
| Sep. 10, 2017 21:10:20 | Cleaning | Coating | Coating | Coating | Coating | Coating |
| Sep. 10, 2017 21:10:00 | Cleaning | Coating | Coating | Coating | Coating | Coating |
| Sep. 10, 2017 21:11:00 | Coating | Coating | Cleaning | Coating | Coating | Coating |
| Sep. 10, 2017 21:11:00 | Coating | Coating | Cleaning | Cleaning | Coating | Coating |
| Sep. 10, 2017 21:11:20 | Coating | Coating | Cleaning | Cleaning | Coating | Coating |
| Sep. 10, 2017 21:12:00 | Coating | Coating | Coating | Cleaning | Coating | Coating |
| Sep. 10, 2017 21:12:20 | Coating | Coating | Coating | Coating | Coating | Cleaning |
| Sep. 10, 2017 21:12:20 | Coating | Coating | Coating | Coating | Coating | Cleaning |
| Sep. 10, 2017 21:13:00 | Coating | Coating | Coating | Coating | Coating | Cleaning |

TABLE 3

| | Zone 0 | Zone 1 | Zone 2 | Zone 3 | Zone 4 | Zone 5 |
|---|---|---|---|---|---|---|
| Sep. 10, 2017 21:10:00 | Cleaning | Coating | Cleaning | Cleaning | Coating | Cleaning |
| Sep. 10, 2017 21:10:20 | Cleaning | Coating | Cleaning | Cleaning | Coating | Cleaning |
| Sep. 10, 2017 21:10:40 | Cleaning | Coating | Cleaning | Cleaning | Coating | Cleaning |
| Sep. 10, 2017 21:11:00 | Coating | Coating | Coating | Coating | Coating | Coating |
| ... | ... | ... | ... | ... | ... | ... |

Figure 5:
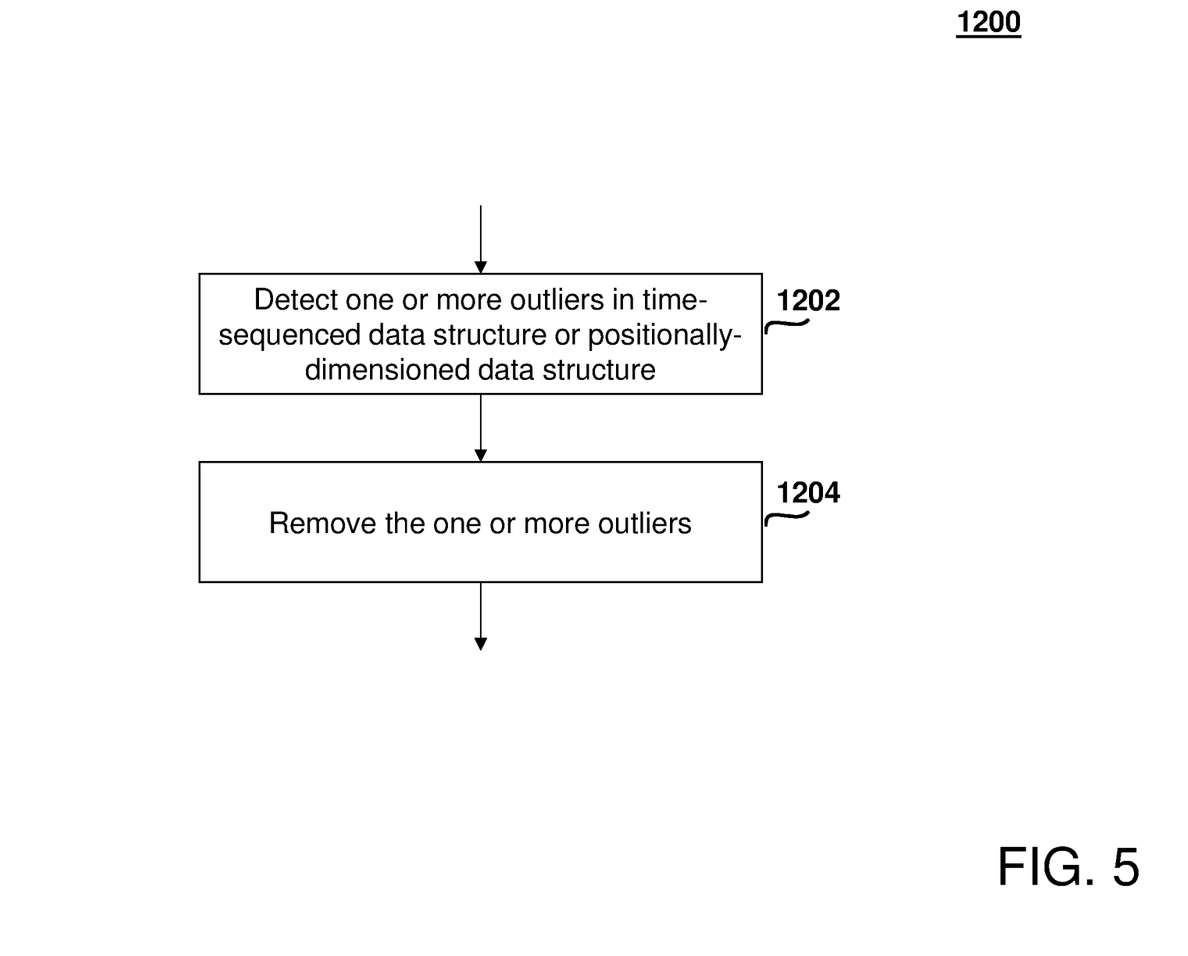
FIG. 5 illustrates a process diagram of non-limiting embodiments or aspects of a method for optimizing a manufacturing process.

Referring now to FIG. 5, depicted is a process 1200 for optimizing a manufacturing process according to non-limiting embodiments or aspects. One or more steps of process 1200 may be executed by one or more same computing devices of one or more other steps of the process 1200. One or more steps of the process 1200 may be executed by one or more computing devices of a communication network 816, input storage system 818, output storage system 824, and/or other systems for controlling devices of the system 800 of FIG. 1. The depicted process 1200 may be representative of a method of cleaning/processing data for input to a machine-learning model and/or data matrix transformation process.

In step 1202, one or more outliers may be detected. For example, the input storage system 818 may detect one or more outlier parameter values in the time-sequenced data structure or the positionally-dimensioned data structure. Outlier detection may be conducted using the interquartile range method. Outlier detection may be facilitated by identifying powered-off zones and powered-on zones, in which powered-off zones may produce parameter values of zero that would skew the data distributions.

In step 1204, the one or more outliers may be removed. For example, the input storage system 818 may remove the one or more outlier parameter values from the time-sequenced data structure or the positionally-dimensioned data structure. By way of further example, zero-valued parameters of powered-off zones may be removed from a respective data structure.

Figure 6:
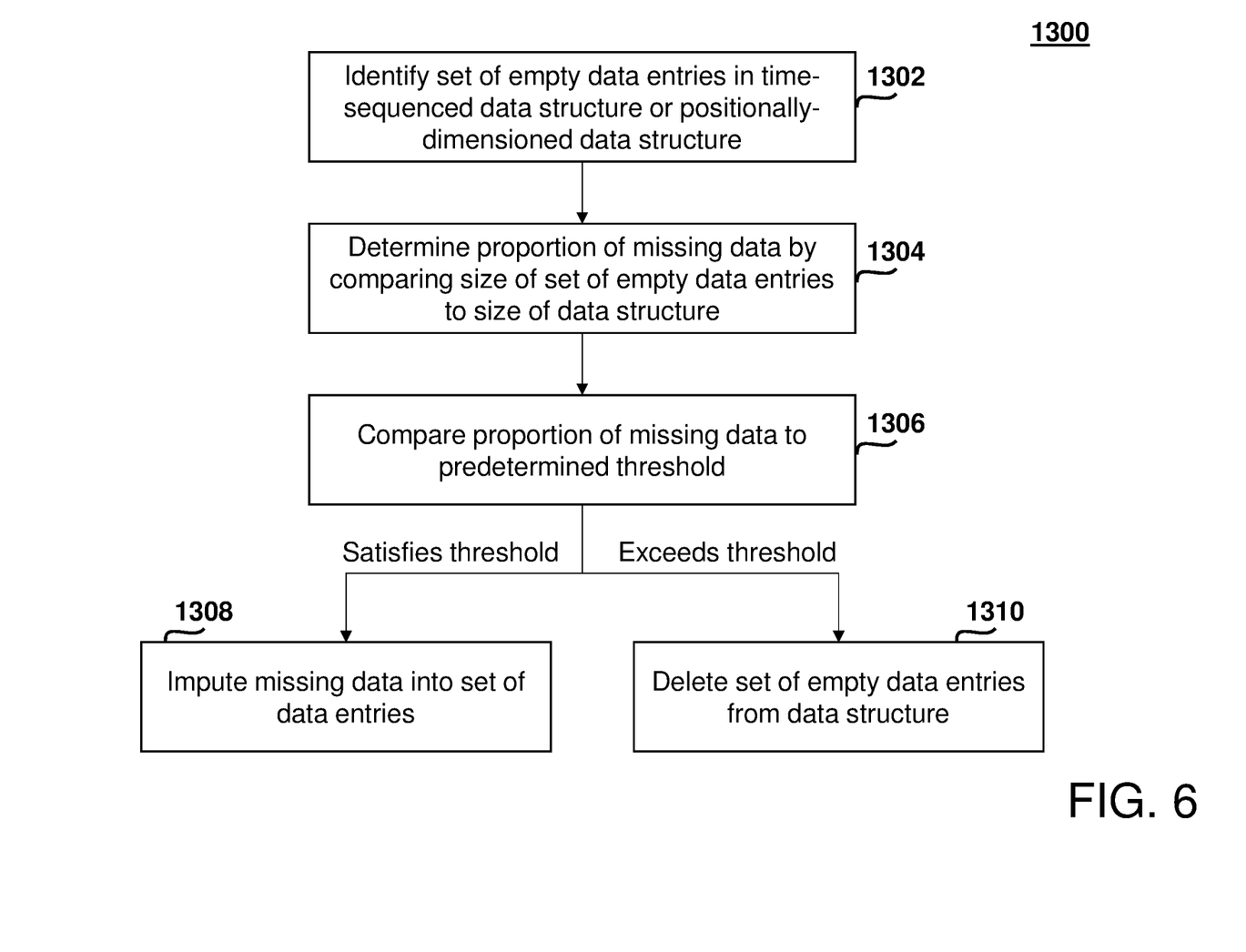
FIG. 6 illustrates a process diagram of non-limiting embodiments or aspects of a method for optimizing a manufacturing process.

Referring now to FIG. 6, depicted is a process 1300 for optimizing a manufacturing process according to non-limiting embodiments or aspects. One or more steps of process 1300 may be executed by one or more same computing devices of one or more other steps of the process 1300. One or more steps of the process 1300 may be executed by one or more computing devices of a communication network 816, input storage system 818, output storage system 824, and/or other systems for controlling devices of the system 800 of FIG. 1. The depicted process 1300 may be representative of a method of cleaning/processing data for input to a machine-learning model and/or data matrix transformation process.

In step 1302, a set of empty data entries may be identified. For example, the input storage system 818 may identify a set of empty data entries in the time-sequenced data structure or the positionally-dimensioned data structure. The set of empty data entries may be a contiguous set of rows and/or columns that lack data measured for a given time and/or position. In step 1304, the proportion of missing data may be determined. For example, the input storage system 818 may determine a proportion of missing data by comparing a size (e.g., number of rows and/or columns, data size, etc.) of the set of empty data entries to the size of the time-sequenced data structure or the positionally-dimensioned data structure (e.g., rows and/or columns of the entire set, data size of the entire set, etc.).

In step 1306, the proportion of missing data may be compared to a predetermined threshold. For example, the input storage system 818 may compare the determined proportion of missing data to a predetermined tolerance threshold (e.g., a threshold size of missing data). The predetermined tolerance threshold may be determined by machine-learning model and/or user input. The predetermined tolerance threshold may represent a threshold size of missing data that, if exceeded, indicates the missing data entries rows and/or columns should be deleted, rather than filled in with imputed data. In some non-limiting embodiments or aspects, the predetermined tolerance threshold may be 5% (e.g., the missing data may be no more than 5% of the time-sequenced data structure or positionally-dimensioned data structure).

In step 1308, in response to the proportion of missing data satisfying the predetermined tolerance threshold (e.g., less than, equal or less than, etc.), the missing data may be imputed. For example, the input storage system 818 may impute data into the set of empty data entries. In some non-limiting embodiments or aspects, a constant value from an adjacent (e.g., previous, subsequent) data record (e.g., row and/or column) may be imputed into a data record having missing data values. Additionally or alternatively, a machine-learning model may predict the missing values of the set of empty data entries based on historic data.

In step 1310, in response to the proportion of missing data not satisfying the predetermined tolerance threshold (e.g., greater than, equal to or greater than, etc.), the set of empty data entries may be deleted. For example, the input storage system 818 may delete the set of empty data entries from the time-sequenced data structure or the positionally-dimensioned data structure.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

The invention claimed is:

1. A computer-implemented method to optimize a manufacturing process, comprising:
    receiving, with at least one processor, manufacturing data associated with the manufacturing process for manufacturing a product, the manufacturing data comprising data from a plurality of data sources associated with a plurality of stages of the manufacturing process, the manufacturing data comprising values for a plurality of parameters including at least one process parameter value and at least one quality parameter value;
    generating, with the at least one processor, a time-sequenced data structure comprising the manufacturing data, wherein each parameter of the plurality of parameters is associated with a time in the time-sequenced data structure;
    transforming, with the at least one processor, the time-sequenced data structure to a positionally-dimensioned data structure based on timing data associated with the plurality of stages, wherein said each parameter of the plurality of parameters is associated with at least one position, and wherein transforming the time-sequenced data structure comprises:
        identifying a zone for said each parameter of the plurality of parameters, wherein the zone for said each parameter is a location through which the product is at least one of transported, modified, treated, or assembled;
        determining a time delay factor based on a length of the zone for the parameter and a line speed of the zone; and
        generating the positionally-dimensioned data structure using a data matrix transformation based on the time-sequenced data structure, the zone for said each parameter, and the time delay factor for said each parameter;
    determining, with the at least one processor, a new value for the at least one process parameter value based on the positionally-dimensioned data structure and at least one algorithm; and
    optimizing the manufacturing process based on the new value.

2. The computer-implemented method of claim 1, wherein the manufacturing process comprises a glass manufacturing process and the product comprises a coated glass product.

3. The computer-implemented method of claim 2, wherein the plurality of parameters comprises: temperature, event time, electrical arcing, gas flow, voltage, current, power, pressure, or any combination thereof.

4. The computer-implemented method of claim 1, further comprising:
    detecting, with the at least one processor, at least one outlier parameter value in the time-sequenced data structure or the positionally-dimensioned data structure; and
    removing, with the at least one processor, the at least one outlier parameter value.

5. The computer-implemented method of claim 1, wherein the at least one algorithm comprises a machine-learning algorithm configured to output the new value based on a model and at least one user input value.

6. The computer-implemented method of claim 1, further comprising:
    identifying, with the at least one processor, a set of empty data entries in the time-sequenced data structure or the positionally-dimensioned data structure;
    determining, with the at least one processor, a proportion of missing data by comparing a size of the set of empty data entries to the size of the time-sequenced data structure or the positionally-dimensioned data structure; and
    comparing, with the at least one processor, the proportion of missing data to a predetermined tolerance threshold.

7. The computer-implemented method of claim 6, further comprising, in response to the proportion of missing data not satisfying the predetermined tolerance threshold, deleting the set of empty data entries from the time-sequenced data structure or the positionally-dimensioned data structure.

8. The computer-implemented method of claim 6, further comprising, in response to the proportion of missing data satisfying the predetermined tolerance threshold, imputing data into the set of empty data entries.

9. A system for optimizing a manufacturing process, comprising:
    at least one processor programmed or configured to:
        receive manufacturing data associated with the manufacturing process for manufacturing a product, the manufacturing data comprising data from a plurality of data sources associated with a plurality of stages of the manufacturing process, the manufacturing data comprising values for a plurality of parameters including at least one process parameter value and at least one quality parameter value;
        generate a time-sequenced data structure comprising the manufacturing data, wherein each parameter of the plurality of parameters is associated with a time in the time-sequenced data structure;
        transform the time-sequenced data structure to a positionally-dimensioned data structure based on timing data associated with the plurality of stages, wherein said each parameter of the plurality of parameters is associated with at least one position, and wherein, while transforming the time-sequenced data structure, the at least one processor is programmed or configured to:
            identify a zone for said each parameter of the plurality of parameters, wherein the zone for said each parameter is a location through which the product is at least one of transported, modified, treated, or assembled;
            determine, for said each parameter, a time delay factor based on a length of the zone for the parameter and a line speed of the zone; and
            generate the positionally-dimensioned data structure using a data matrix transformation based on the time-sequenced data structure, the zone for said each parameter, and the time delay factor for said each parameter;
        determine a new value for the at least one process parameter value based on the positionally-dimensioned data structure and at least one algorithm; and optimize the manufacturing process based on the new value.

10. The system of claim 9, wherein the manufacturing process comprises a glass manufacturing process and the product comprises a coated glass product.

11. The system of claim 10, wherein the plurality of parameters comprises: temperature, event time, electrical arcing, gas flow, voltage, current, power, pressure, or any combination thereof.

12. The system of claim 9, wherein the at least one processor is further programmed or configured to:
   detect at least one outlier parameter value in the time-sequenced data structure or the positionally-dimensioned data structure; and
   remove the at least one outlier parameter value.

13. The system of claim 9, wherein the at least one algorithm comprises a machine-learning algorithm configured to output the new value based on a model and at least one user input value.

14. A computer program product for optimizing a manufacturing process, comprising at least one non-transitory computer-readable medium storing program instructions that, when executed by at least one processor, cause the at least one processor to:
   receive manufacturing data associated with the manufacturing process for manufacturing a product, the manufacturing data comprising data from a plurality of data sources associated with a plurality of stages of the manufacturing process, the manufacturing data comprising values for a plurality of parameters including at least one process parameter value and at least one quality parameter value;
   generate a time-sequenced data structure comprising the manufacturing data, wherein each parameter of the plurality of parameters is associated with a time in the time-sequenced data structure;
   transform the time-sequenced data structure to a positionally-dimensioned data structure based on timing data associated with the plurality of stages, wherein said each parameter of the plurality of parameters is associated with at least one position, and wherein the program instructions that cause the at least one processor to transform the time-sequenced data structure cause the at least one processor to:
      identify a zone for said each parameter of the plurality of parameters, wherein the zone for said each parameter is a location through which the product is at least one of transported, modified, treated, or assembled;
      determine, for said each parameter, a time delay factor based on a length of the zone for the parameter and a line speed of the zone; and
      generate the positionally-dimensioned data structure using a data matrix transformation based on the time-sequenced data structure, the zone for said each parameter, and the time delay factor for said each parameter;
   determine a new value for the at least one process parameter value based on the positionally-dimensioned data structure and at least one algorithm; and
   optimize the manufacturing process based on the new value.

15. The computer program product of claim 14, wherein the manufacturing process comprises a glass manufacturing process, the product comprises a coated glass product, and the plurality of parameters comprises: temperature, event time, electrical arcing, gas flow, voltage, current, power, pressure, or any combination thereof.

16. The computer program product of claim 14, wherein the program instructions further cause the at least one processor to:
   detect at least one outlier parameter value in the time-sequenced data structure or the positionally-dimensioned data structure; and
   remove the at least one outlier parameter value.

17. The computer program product of claim 14, wherein the at least one algorithm comprises a machine-learning algorithm configured to output the new value based on a model and at least one user input value.

* * * * *